United States Patent [19]
De Vaan et al.

[11] Patent Number: 6,024,451
[45] Date of Patent: Feb. 15, 2000

[54] ILLUMINATION SYSTEM AND IMAGE PROJECTION DEVICE PROVIDED WITH SUCH AN ILLUMINATION SYSTEM

[75] Inventors: Adrianus J. S. M. De Vaan, Eindhoven; Antonie W. Damen, Tilburg, both of Netherlands

[73] Assignee: U.S. Philips Corporation, New York, N.Y.

[21] Appl. No.: 08/976,524

[22] Filed: Nov. 21, 1997

[30] Foreign Application Priority Data

Nov. 25, 1996 [EP] European Pat. Off. .............. 96203307

[51] Int. Cl.[7] .................................................. G03B 21/28
[52] U.S. Cl. ................................. 353/20; 353/98
[58] Field of Search ................... 353/20, 38, 98, 353/99, 73; 359/487, 495, 501

[56] References Cited

U.S. PATENT DOCUMENTS

| | | | |
|---|---|---|---|
| 5,098,184 | 3/1992 | Van Den Brandt et al. | 353/102 |
| 5,535,054 | 7/1996 | Shibuya | 359/487 |
| 5,601,351 | 2/1997 | Van Den Brandt | 353/20 |
| 5,626,408 | 5/1997 | Heynderickx et al. | 353/20 |
| 5,826,959 | 10/1998 | Atsuchi | 353/20 |
| 5,853,240 | 12/1998 | Tanaka et al. | 353/20 |
| 5,865,521 | 2/1999 | Hashizume et al. | 353/20 |
| 5,898,521 | 4/1999 | Okada | 353/20 |

FOREIGN PATENT DOCUMENTS

| | | |
|---|---|---|
| 0467447A1 | 1/1992 | European Pat. Off. . |
| 9619752A1 | 6/1996 | WIPO . |

*Primary Examiner*—William Dowling
*Attorney, Agent, or Firm*—F. Brice Faller

[57] ABSTRACT

The invention relates to an illumination system (1) comprising, in this order, a radiation source (5) and an integrator system (11). First reflecting means are present in the exit plane (25) of the integrator system (11) and second reflecting means in the form of a reflective polarizer (29) are further present in the illumination system (1). An optical system (23) for at least partly imaging the exit surface of the integrator system (11) via the second reflecting means on the first reflecting means is present between the first reflecting means and the second reflecting means. Moreover, polarization-converting means are present between the first and the second reflecting means.

The invention also relates to an image projection device and to a presentation system provided with such an illumination system.

20 Claims, 4 Drawing Sheets

ILLUMINATION SYSTEM AND IMAGE PROJECTION DEVICE PROVIDED WITH SUCH AN ILLUMINATION SYSTEM

BACKGROUND OF THE INVENTION

The invention relates to an illumination system comprising, in this order, a radiation source and an integrator system.

The invention also relates to an image projection device provided with such an illumination system.

An image projection device with an illumination system of the type described in the opening paragraph is known from, inter alia, U.S. Pat. No. 5,098,184. The image projection device described in this Patent comprises an illumination system for supplying an illumination beam and an image display system having at least one display panel for modulating this light beam in conformity with image information to be projected. In addition to a radiation source, a reflector behind the radiation source and a condensor lens, the illumination system also includes an integrator system. A further lens ensuring that all re-images are superimposed in the plane of the display panel is present behind the integrator system.

If the display panel adds image information to the light beam by means of polarization modulation, the liquid crystalline display panel is generally situated between two polarizers. If unpolarized light is incident on the display panel, substantially half of it will be absorbed by the first polarizer and will thus be lost for the formation of the image. Moreover, the absorption gives rise to heating of the polarizer and the display panel, so that the display panel may be damaged.

It is an object of the invention to provide an illumination system in which substantially the complete unpolarized light beam emitted by the radiation source is converted into a light beam having one and the same direction of polarization, without any noticeable loss of light occurring. In this way, an illumination system having a relatively large light output is realized without extra efforts to be made for the radiation source itself.

To this end, the illumination system according to the invention is characterized in that first reflecting means are present in the exit plane of the integrator system, in that the illumination system further includes second reflecting means in the form of a reflective polarizer, in that an optical system for at least partly imaging the exit surface of the integrator system via the second reflecting means on the first reflecting means is present between the first reflecting means and the second reflecting means, and in that polarization-converting means are present between the first and the second reflecting means.

The present invention is based on the recognition that a light-obstructing or light-absorbing element having the function of eliminating one of the directions of polarization from a light beam is replaced by a reflecting element, so that the unwanted direction of polarization can be recuperated, converted by the polarization-converting means into the desired direction of polarization and thus be given another chance to contribute as yet to the light output.

The above-mentioned inventive idea is realized by a combination of first and second reflecting means, between which the unwanted light is reflected, and polarization-converting means for at least partly converting unwanted light into wanted light. The unwanted light is thus recuperated instead of being absorbed or obstructed, so that a relatively high light output is realized without further complicating the illumination system.

The optical system ensures that the light coming from the second reflecting means at least partly reaches the first reflecting means, and vice versa.

The integrator system may be implemented in different manners.

A first embodiment of the illumination system according to the invention is characterized in that the integrator system comprises a first and a second lens plate, in which the lenses of the second lens plate jointly constitute the exit surface of the integrator system.

In this case, the plane of the second lens plate is situated in the exit plane of the integrator system. The exit surface of the integrator system is situated in the exit plane. The second lens plate surface contributing to the integrator function, in other words, the surface occupied by the lenses of the second lens plate, is understood to be the exit surface.

Each lens plate is provided with a matrix of lenses, with each lens of the first lens plate imaging the radiation source on a lens of the second lens plate. Each lens of the second lens plate images the corresponding first lens on the record carrier which is illuminated by the illumination system.

A further embodiment of the illumination system according to the invention is characterized in that the first reflecting means have reflecting elements which are present on the second lens plate.

SUMMARY OF THE INVENTION

In this case, the second lens plate comprises both lenses and reflecting elements. There are different possibilities for the configuration of the lenses and the reflecting elements.

Another embodiment of the illumination system according to the invention is characterized in that the first reflecting means comprise at least one reflecting element adjoining the second lens plate and being situated in the exit plane of the integrator system.

In this case, at least one separate reflecting element is arranged in the plane of the first reflecting means.

Another embodiment of the illumination system according to the invention, in which the integrator system is implemented in a different manner, is characterized in that the integrator system comprises an optically transparent bar whose end face remote from the radiation source constitutes the exit surface of the integrator system.

Since reflection of the light in the bar occurs at the side walls of the bar, a homogeneous light distribution will be produced at the end face of the bar remote from the radiation source.

The end face of the bar remote from the radiation source may be considered to be the exit surface of the integrator system. The plane in which the exit surface is situated is the exit plane of the integrator system.

A further embodiment of the illumination system according to the invention is characterized in that the first reflecting means comprise at least one reflecting element adjoining the end face of the bar, which reflecting element is situated in the exit plane of the integrator system.

In this case, the first reflecting means are constituted by one or more separately reflecting elements arranged in the exit plane of the integrator system.

A further embodiment of the illumination system according to the invention is characterized in that the plane of the second reflecting means encloses an angle different from 90° with the optical axis, and in that the optical system comprises a first and a second lens, the image of the exit surface of the integrator system made by the first lens being situated in the focal plane of the second lens.

By tilting the plane of the second reflecting means, the image of the exit surface of the integrator system can be shifted across the exit plane. By means of the optical system, the reflected image geometrically has the same properties as the light incident through the exit surface itself.

A further embodiment of the illumination system according to the invention is characterized in that the polarizer is a linear retro-directive polarizer.

When a light beam arrives at the reflective polarizer, the unwanted direction of polarization will be reflected again into the direction from which it came and consequently arrive at the first reflecting means. The polarization-converting means ensure that the direction of polarization of this light is converted, so that this light, after reflection on the first reflecting means, gets another chance of contributing to the light output of the illumination system.

Another embodiment of the illumination system according to the invention is characterized in that the polarizer is a cholesteric polarizer.

In this case, the unpolarized light emitted by the light source is circularly polarized on the polarizer.

A cholesteric polarizer is a known element. Such a polarizer has an optical layer of liquid crystalline polymer material with a cholesteric ordering. This means that the molecules of the material order spontaneously in solution to a helical or helix-like structure having a pitch p. After providing such a solution as a thin, active layer between two parallel substrates, the helix-like structure is directed in such a way that the axis of the helix will be transverse to the layer.

When an unpolarized beam is incident on a cholesteric polarizer, the laevorotatory and dextrorotatary circularly polarized beam components will be separated from each other. Namely, a beam component having the direction of rotation corresponding to the direction of the helix will be reflected, whereas the beam component having the other direction of rotation will be passed. Passing or not passing is, however, not only determined by the direction of rotation but also by the wavelength of the incident beam. The reflection wavelength $\lambda_0 = \frac{1}{2} (n_o + n_e) p$. Of the beam component having the direction of rotation corresponding to the direction of the pitch, only that part which is within the wavelength band $\lambda_0$ will be reflected.

Another embodiment of the illumination system according to the invention is characterized in that the polarizer is a polarizing beam splitter.

A further embodiment of the illumination system according to the invention is characterized in that the first reflecting means are specularly reflecting and in that a $\lambda/4$ plate is present on the first reflecting means or between the first and the second reflecting means.

In order that the light reflected by the reflective polarizer can be passed by the polarizer upon another chance, the unwanted direction of polarization between the first and second reflecting means should be converted into the wanted direction of polarization. This may be realized, for example, by implementing the first reflecting means as specular means and by providing a $\lambda/4$ plate on the first reflecting means or between the first and the second reflecting means. The linearly polarized light from the polarizer is then first converted by the $\lambda/4$ plate into circularly polarized light. The direction of polarization of the specular reflector is inverted on this reflector. When this circularly polarized beam passes the $\lambda/4$ plate again, it will be converted into a linearly polarized beam having the direction of polarization which is complementary to the original beam.

Another embodiment of the illumination system according to the invention is characterized in that the first reflecting means are specular means.

When the beam component reflected by the cholesteric polarizer arrives at the first reflecting means again, the direction of polarization thereof will be inverted, provided that the first reflecting means reflect specularly. Subsequently, the beam component coming from the first reflecting means will have the suitable direction of polarization to be passed by the cholesteric polarizer.

A further embodiment of the illumination system according to the invention is characterized in that the cholesteric polarizer has a single layer of a liquid crystalline polymer material, within which layer the pitch of the molecular helix varies between two values which correspond to the lower limit and the upper limit, respectively, of the reflection band required to cover at least the full visible wavelength range.

This provides the possibility of polarization separation throughout the visible wavelength range. This is particularly advantageous in a color image projection device with a single display panel. A cholesteric polarizer consisting of a single layer has the advantage that a relatively high optical quantity can be achieved and that it may be relatively thin, despite the large wavelength range. Moreover, the fact that the reflection waveband shifts for non-perpendicular angles of incidence on the polarizer can be taken into account in a simple manner.

A further embodiment of the illumination system according to the invention is characterized in that a $\lambda/4$ plate is present between the cholesteric polarizer and the display panel.

There are display panels modulating circularly polarized light, as well as display panels modulating linearly polarized light. Since a cholesteric polarizer is a circular polarizer, a $\lambda/4$ plate is to be arranged between the polarizer and the display panel in the case of a linear display panel, so as to convert the desired circularly polarized beam component into a linearly polarized beam component.

A further embodiment of the illumination system according to the invention, in which the integrator system comprises a first and a second lens plate, is characterized in that the second lens plate is semicircular, the illumination system being adapted to supply a semicircular illumination beam at the location of the second lens plate.

In this way, the pupil of the projection lens can be optimally filled with light.

The invention also relates to an image projection device comprising, in this order, an illumination system, an image display system for modulating an illumination beam to be supplied by the illumination system, and a projection lens system, the illumination system being implemented as described hereinbefore.

An embodiment of the image projection device according to the invention, in which the integrator system comprises a first and a second lens plate, is characterized in that the lenses of the first lens plate have an aspect ratio which corresponds to that of the display panel.

In this way, an efficient illumination of the display panel is realized.

The invention also relates to a presentation system comprising an image projection screen and an overhead projector which is provided with an illumination system as described hereinbefore.

An embodiment of the presentation system according to the invention is characterized in that the image projection screen is provided with a polarizer whose transmission polarization direction corresponds to the direction of polarization of the illumination beam to be supplied by the illumination system.

The invention also relates to an integrator system suitable for use in an illumination system according to the invention.

It is to be noted that all of the above-mentioned λ/4 plates are preferably achromatic, i.e. they are active in a wide wavelength range, so that the invention may be used without any problem in color image projection devices.

These and other aspects of the invention are apparent from and will be elucidated with reference to the embodiments described hereinafter.

DETAILED DESCRIPTION OF THE PREFERRED EMBODIMENTS

Figure 1A:
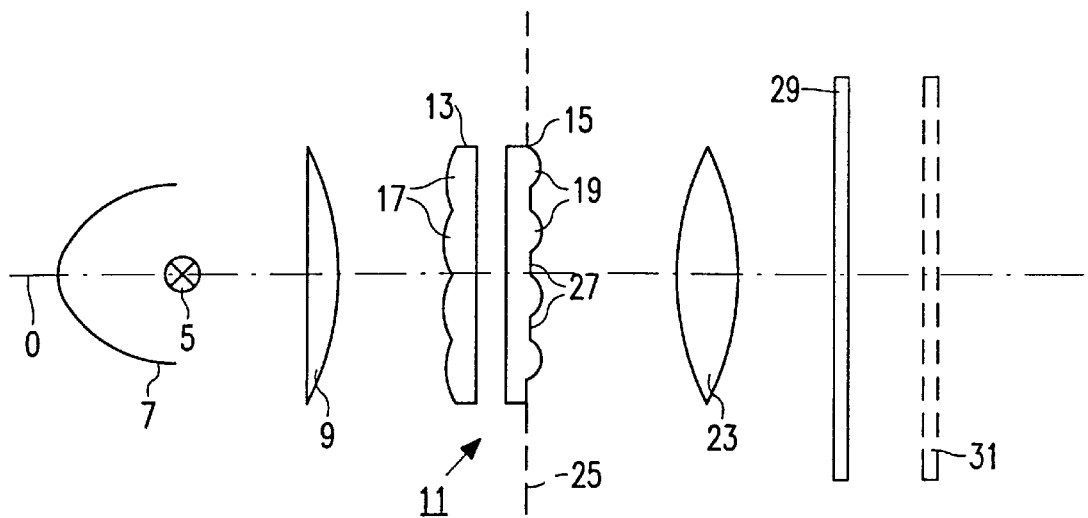
FIGS. 1(a), 1(b), 2 and 3 show embodiments of an illumination system according to the invention.

The illumination system 1 shown diagrammatically in FIG. 1(a) comprises a radiation source 5 which is partly surrounded by, for example, a parabolic reflector 7 and is followed by a condensor lens 9. The radiation source 5 may also be partly surrounded by a spherical reflector. In that case, the condensor lens may be dispensed with.

The illumination system I further comprises an integrator system 11 for optimizing the homogeneity and the light output. The integrator system 11 may consist of a first lens plate 13 and a second lens plate 15, as is shown in the embodiments in FIGS. 1(a) and 1(b). Each lens plate 13, 15 comprises a plurality of lenses denoted by 17, 19, respectively, which are arranged in the form of a matrix. Each lens 17 of the first lens plate 13 makes a lamp image in a corresponding lens 19 of the second lens plate 15. Each lens 19 of the second lens plate 15 makes an image of the corresponding lens 17 in the first lens plate 13 at the position of a window image, with all images being superimposed at the location of the window image.

Figure 3:
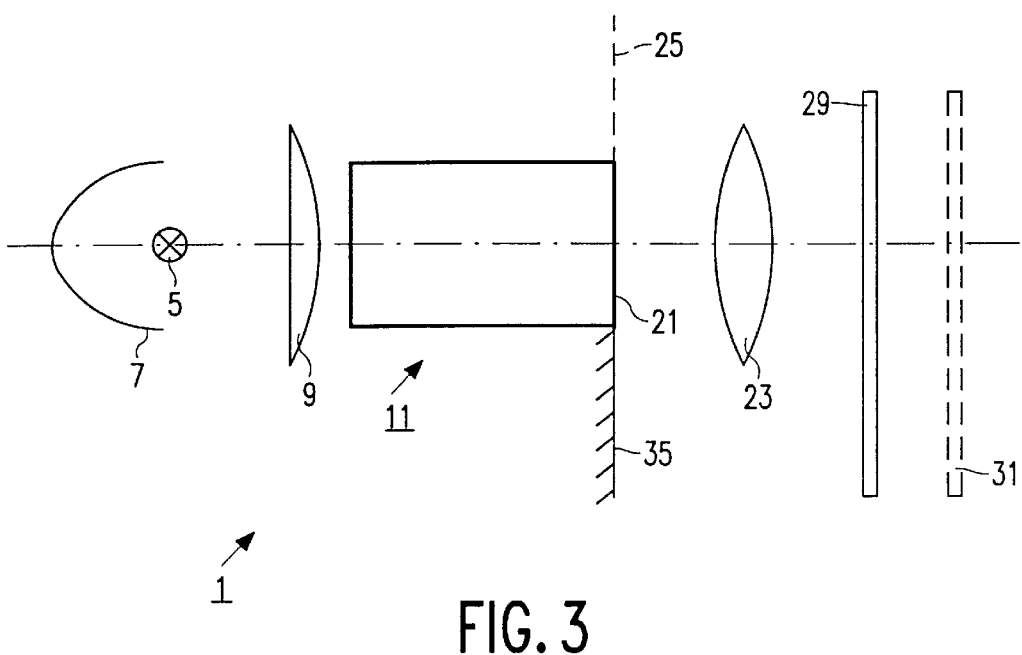

The integrator system 11 may also be constituted by an optically transparent bar, as is shown in FIG. 3. The light coupled into the bar will be reflected several times on the side walls so that a homogeneous light distribution will be realized at the end face 21 of the bar remote from the radiation source 5.

The present invention proposes to implement the illumination system in such a way that substantially the complete unpolarized beam supplied by the radiation source is converted into a beam having one and the same direction of polarization without any noticeable loss of light occurring. This can be realized by providing first reflecting means in the exit plane 25 of the integrator system 11, by further providing second reflecting means in the form of a reflective polarizer 29 in the illumination system 1, with the exit surface of the integrator system 11 being imaged in the exit plane 25 via the second reflecting means by means of an optical system 23 which is situated between the first and the second reflecting means, and by providing further polarization-converting means.

The exit plane 25 is the plane in which the exit surface of the integrator system 11 is located. If the integrator system comprises a first and a second lens plate, the exit surface is constituted by the second lens plate 15. If the integrator system 11 is an optically transparent bar, the exit plane 25 is the plane in which the end face 21 is situated.

Figure 1B:
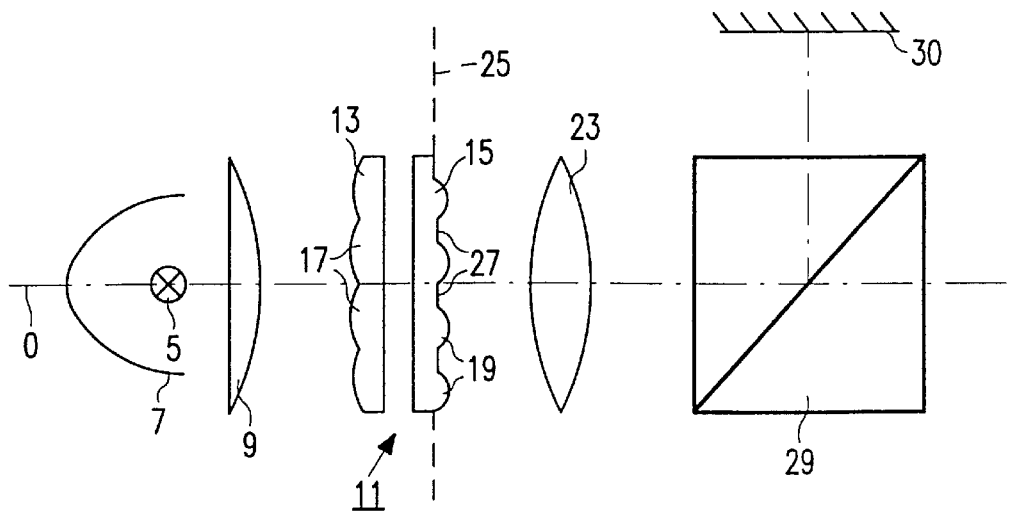
Figure 2:
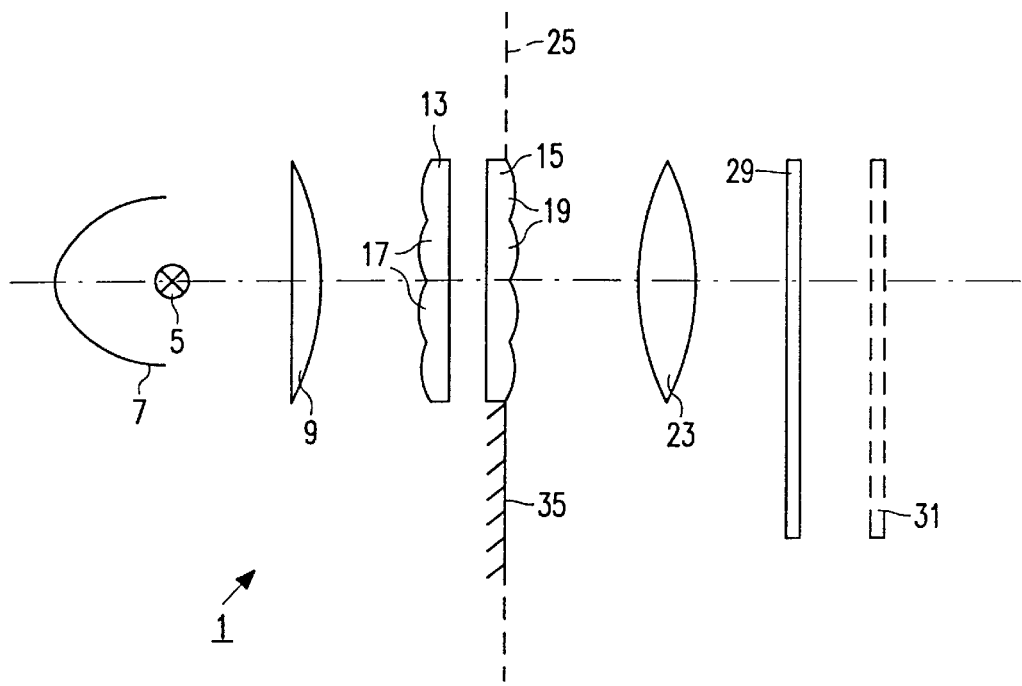

In FIGS. 1(a) and 1(b), the first reflecting means have reflecting elements 27 which are integrated with the second lens plate. In FIGS. 2 and 3, the first reflecting means comprise at least one separate reflecting element which is arranged in the exit plane 25.

The illumination system further comprises second reflecting means in the form of a reflective polarizer 29 in the three Figures.

An optical system, represented by a single lens 23 for the sake of simplicity, is present between the first and the second reflecting means. The exit surface of the integrator system 11 is imaged by means of this optical system 23 in the exit plane 25 of the integrator system via the second reflecting means 29. By placing the first reflecting means at the location of this image, the light can be reflected to the second reflecting means again.

In the manner as described above, it is possible to recuperate light emitted by the radiation source 5 and having an unwanted direction of polarization and to give it a second chance of being as yet incident on the second reflecting means with a different direction of polarization, and of being passed.

Different embodiments are possible, both for the first and the second reflecting means.

As already mentioned, the first reflecting means may be constituted by a separate element which is situated in the exit plane of the integrator system 11. This embodiment is possible for both embodiments of the integrator system. The first reflecting means may also be integrated in the second lens plate 15. This embodiment is only possible if it is an integrator system with lens plates.

The plane of the second reflecting means is preferably tilted with respect to the optical axis, so that the image of the exit surface of the integrator system is shifted across the exit surface.

Figure 4A:
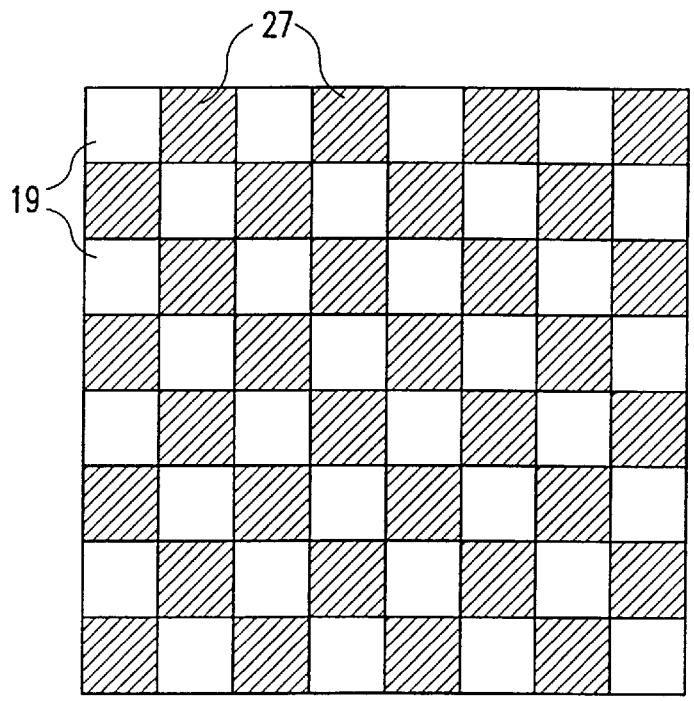
FIG. 4(a) shows a possible distribution of lens elements and reflecting elements on the surface of the second lens plate.

The optical system 23 may comprise, for example two lenses, with a window image of each lens 19 of the second lens plate 15 being produced in the focal plane of the first lens, all of which images coincide. A window image is to be understood to mean the cross-section of the illumination beam at the location of a record carrier to be illuminated. By changing the focal length of the first lens, the size of the window image can be adapted. The second lens is chosen to be such that it images the second lens plate 15 at infinity, with the image of the second lens plate 25 made by the first lens being located in the focal plane of the second lens. Due to this choice of the first lens and the second lens, the image of the second lens plate 15 reaches the original plane 25 again after reflection on the reflecting elements 27, without having changed size. The second lens plate 15 comprises, for example, as many reflecting elements 27 as lens elements 19 and, moreover, the reflecting elements 27 and the lens elements 19 have equal sizes. FIG. 4(a) shows a possible distribution of the lens elements 19 and the reflecting elements 27 on the surface of the second lens plate 15.

Since the plane of the second reflecting means is tilted with respect to the optical axis, each lens of the second lens plate can be imaged on a reflecting element positioned between the lenses. After reflection on these elements in the second lens plate, the light cones coming from these elements will be the same as those coming from the lenses of the second lens plate, because the light cones coming from the reflecting elements and those coming from the lenses of the second lens plate are geometrically identical. In this way, the light output of the illumination system can be increased considerably.

Another embodiment of the first reflecting means is implemented by providing a separate reflecting element in the exit plane 25 of the integrator system 11, beside and/or above the exit surface of the integrator system. In this case, the first reflecting means are not integrated with the second lens plate. This embodiment can be used for both possibilities of implementing the integrator system and will be extensively described hereinafter.

The second reflecting means are implemented as a reflective polarizer. There are different possibilities for this implementation. The reflective polarizer 29 may be a linear retro-directive polarizer. When an unpolarized beam is incident on such a polarizer, half of this beam will be passed. The other direction of polarization will be reflected into the direction from which the beam originated. In order that the reflected beam is given a second chance and can as yet contribute to the formation of the image, polarization-converting means should be present on the first reflecting means or between the first and the second reflecting means. To this end, the first reflecting means may implemented as a specular reflector, with a λ/4 plate being present in the light path between the polarizer and the first reflecting means. The λ/4 plate may be present, for example, on or proximate to the first reflecting means. Consequently, the direction of polarization will be converted into the complementary direction of polarization and will consequently be passed when it reaches the polarizer 29.

The reflective polarizer 29 may also be a cholesteric polarizer. A cholesteric polarizer comprises a liquid crystalline material having a cholesteric ordering and is a circular polarizer which reflects the direction of polarization whose direction of rotation corresponds to the direction of rotation of the molecular helix of the cholesteric material. The reflected direction of polarization should be the direction of polarization which is unwanted for the display panel and is reflected towards the first reflecting means. In combination therewith, the first reflecting means should be implemented as a specular reflector, since a specular reflector converts circularly polarized light into circularly polarized light having the opposite direction of rotation. Upon arrival at the cholesteric polarizer, this direction of rotation will be passed. If it is desirable that the illumination system supplies linearly polarized light, a λ/4 plate 31 for converting the circularly polarized radiation from the cholesteric polarizer into linearly polarized radiation is, for example, situated behind the cholesteric polarizer, as viewed from the radiation source. The λ/4 plate 31 is shown in broken line because it is an optional element. The unpolarized light which is passed via the exit surface of the integrator system, for example, by the lenses 19 of the second lens plate 15, is circularly polarized by the cholesteric polarizer 29. The unwanted direction of polarization is reflected towards the exit plane 29 via the optical system 23 and imaged on the pattern of reflecting elements 27 on the second lens plate 15. Upon reflection on these elements 27, the direction of rotation of the circularly polarized light will be inverted, provided that these elements are implemented as specular reflectors. The light is again incident on the cholesteric polarizer 29 via the optical system 23 and will now have the suitable direction of rotation to be passed.

Yet another possibility is to implement the polarizer 29 as a beam splitter. An embodiment thereof is shown in FIG. 1(b). The light emitted by the radiation source 5 is split up into two directions of polarization. The unwanted direction of polarization is incident on a reflector 30 and will be converted into a different direction of polarization via the first reflecting means and the polarization-converting means.

The polarizer 29 may of course also be implemented as a beam splitter in the embodiments shown in FIGS. 2 and 3. The unwanted direction of polarization is deflected from the light path by the beam splitter 29 and sent to a reflector 35. The first reflecting means should be implemented in a specular form again and a λ/4 plate should be present in the light path between the polarizer 29 and the first reflecting means so as to convert the direction of polarization before the light reaches the beam splitter again. A beam splitter as a polarizer is particularly suitable in an illumination system which is used in an image projection device having a reflective image display system. In such a case, the different directions of polarization should be separated from each other in the direction of propagation.

As previously mentioned, the first reflecting means may alternatively be implemented by a reflecting element 35 which is situated in the exit plane 25 of the integrator system 11. The light reflected on the second reflecting means makes a new image of the exit surface, for example, the lens plate 15 or the end face 21, in the exit plane 29 of the integrator system 19, at the location of which the reflecting element 35 is situated. This reflecting element 35 sends the light again to the polarizer 29 where it is given another chance of being passed if the direction of polarization has been converted.

The reflective polarizer 29 is preferably tilted with respect to the optical axis so that, in combination with the first and the second lens, the light reflected on the polarizer 29 reaches the reflecting element 35. In this case, the reflecting element 35 should be a specular reflector in order to enable it to invert the direction of rotation of the incident polarized light. The reflecting element 35 may be, for example, a metallic mirror. The light reflected by the reflecting element 35 will now be passed by the polarizer 29. The reflected image of the second lens plate 15 or the end face 21 on the reflecting element 35 has the same geometrical properties and shape as the light through the integrator. In the exit plane 25, the reflected image of the exit surface of the integrator system with respect to the optical axis O is a point-mirrored with respect to the light beam passed by the exit surface itself.

In a preferred embodiment of the illumination system comprising an integrator system with two lens plates, the illumination system is implemented in such a way that a beam having a semicircular or quarter-circular cross-section is generated at the location of the second lens plate, without loss of light occurring in the light beam supplied by the light source. In that case, the original and the mirrored images jointly constitute a circular cross-section. The image reflected on the reflecting element 35 again forms a window image via the first and the second lens at exactly the same location as the light passed by the integrator system 11. For further embodiments of the integrator system with two lens plates, reference is made to European Patent Specification EP 0 467 447.

Figure 4B:
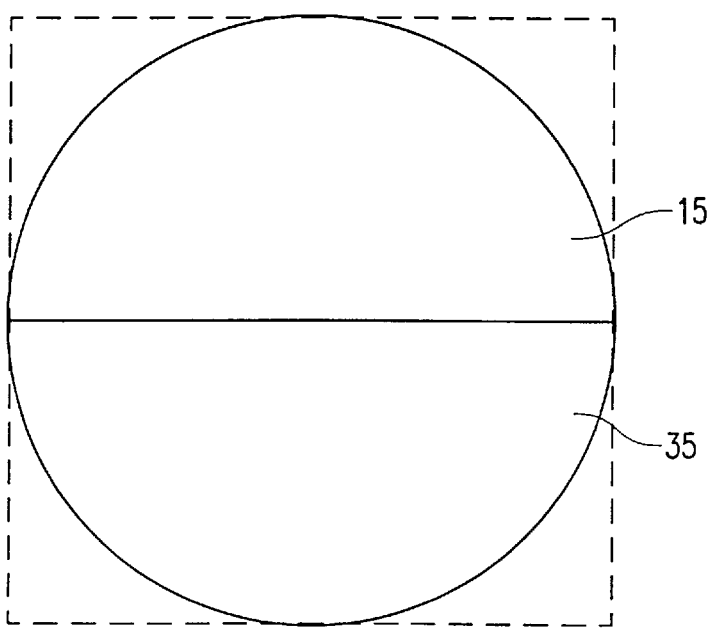
FIG. 4(b) shows a possible distribution of the integrator surface and the reflecting surface on the exit plane of the integrator system for a beam having a semicircular cross-section.

FIG. 4(b) shows a possible configuration for the combination of the exit surface of the integrator system with a separate reflecting element for a semicircular cross-section of the illumination beam. In this way, material may also be saved by adapting the shape of the exit plane 29 to the shape of the cross-section of the light beam.

Since a cholesteric polarizer is a circular polarizer, a $\lambda/4$ plate 31 should be present behind the cholesteric polarizer 29, if the illumination system is to supply linearly polarized light.

Said $\lambda/4$ plates and $\lambda/4$ layers are preferably achromatic.

Figure 5:
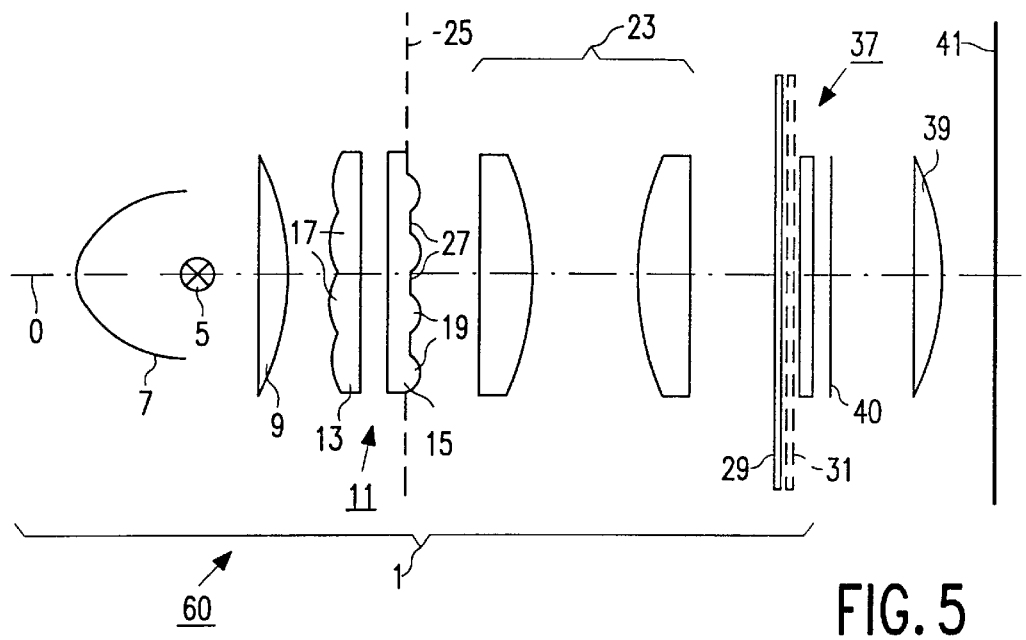
FIG. 5 shows an embodiment of an image projection device which is provided with an illumination system according to the invention.
Figure 6:
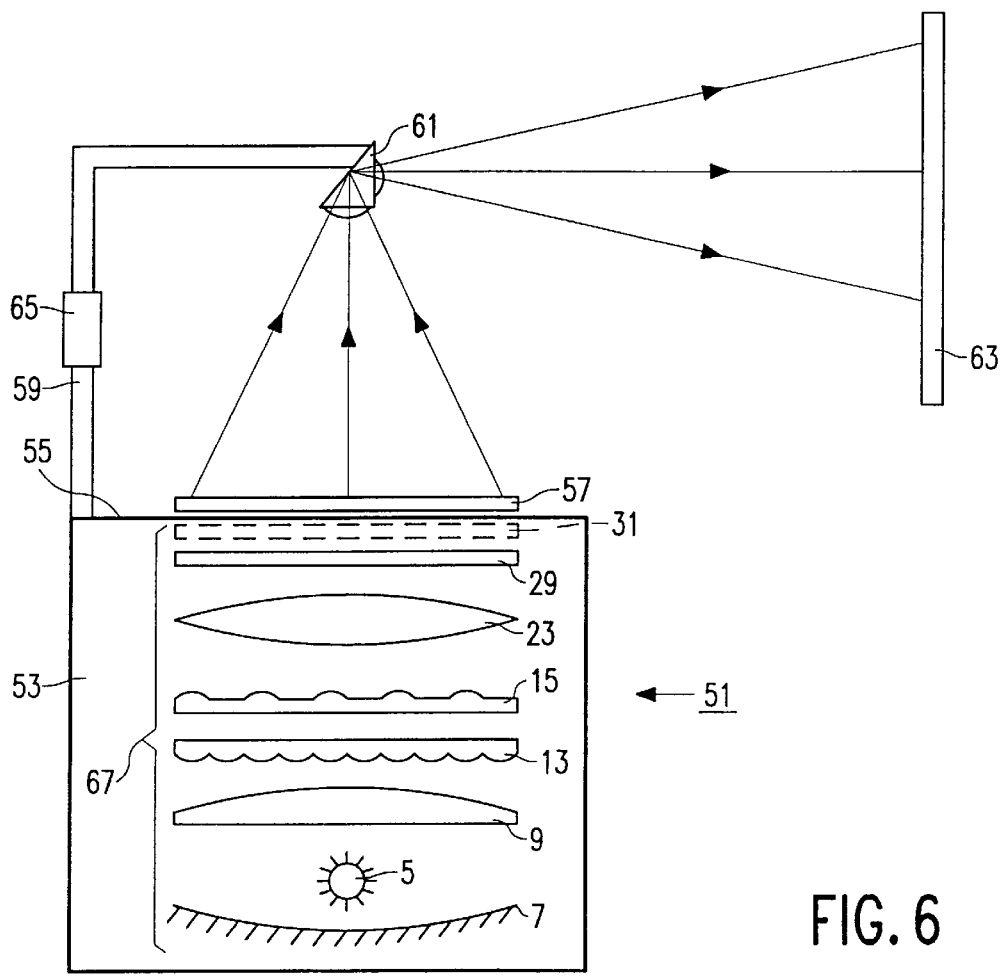
FIG. 6 shows an embodiment of an overhead projector which is provided with an illumination system according to the invention.

FIG. 5 shows an embodiment of an image projection device 60 comprising a display panel 37 which is provided with an illumination system 1 according to the invention. The unpolarized light beam emitted by the radiation source 3 is converted in the illumination system 1 into a light beam having the same direction of polarization. The polarized beam is subsequently incident on the display panel 37 so as to be provided with image information by means of modulation. The display panel consists of, for example a liquid crystalline layer which is enclosed between a first polarizer and a second polarizer. Such a panel consists of two optically transparent plates enclosing a layer of liquid crystalline material and being provided with a two-dimensional array of pixels. Each pixel comprises an active picture element which shuts off the relevant pixel when it is not addressed. The active picture elements acquire their signals via row and column electrodes which also form part of the pixels. If the operation of the display panel is based on polarization modulation, the display panel is generally arranged between a first polarizer for creating polarized light and a second polarizer, referred to as analyzer, for rendering the polarization-modulated light visible as luminance variations. Substantially 50% of the light emitted by the radiation source 5 through the first polarizer is lost. With an illumination system according to the invention, the first polarizer may be dispensed with because the illumination system supplies a polarized light beam. To prevent heating of the analyzer, a refractive analyzer may be chosen. This is an analyzer which does not absorb the light which is unwanted for the formation of images but refracts the light from the light path instead. Subsequently, the beam is converted into an image by means of a projection lens system 39 and projected on an image projection screen 41. In the embodiment shown, the integrator system consists of two lens plates and the first reflecting means are integrated with the second lens plate.

The display panel may be a monochrome panel. If a color image projection device is desirable, for example, the display panel may be a three-color panel or, for example, three color channels may be provided, one for each of the primary colors, and each color channel is then provided with a monochrome display panel. The light beam emitted by the radiation source is first split up into three sub-beams which are recombined

We claim:

1. An illumination system comprising, in this order, a radiation source and an integrator system, wherein first reflecting means are present in the exit plane of the integrator system, the illumination system further includes second reflecting means in the form of a reflective polarizer, an optical system for at least partly imaging the exit surface of the integrator system via the second reflecting means on the first reflecting means is present between the first reflecting means and the second reflecting means, and in that polarization-converting means are present between the first and the second reflecting means.

2. An illumination system as claimed in claim 1, wherein the integrator system comprises a first and a second lens plate, in which the lenses of the second lens plate jointly constitute the exit surface of the integrator system.

3. An illumination system as claimed in claim 2, wherein the first reflecting means have reflecting elements which are present on the second lens plate.

4. An illumination system as claimed in claim 2, wherein the first reflecting means comprise at least one reflecting element adjoining the second lens plate and being situated in the exit plane of the integrator system.

5. An illumination system as claimed in claim 1, wherein the integrator system comprises an optically transparent bar whose end face remote from the radiation source constitutes the exit surface of the integrator system.

6. An illumination system as claimed in claim 5, wherein the first reflecting means comprise at least one reflecting element adjoining the end face of the bar, which reflecting element is situated in the exit plane of the integrator system.

7. An illumination system as claimed in claim 1, wherein the plane of the second reflecting means encloses an angle different from 90° with the optical axis, and the optical system comprises a first and a second lens, the image of the exit surface of the integrator system made by the first lens being situated in the focal plane of the second lens.

8. An illumination system as claimed in claim 1, wherein the polarizer is a linear retro-directive polarizer.

9. An illumination system as claimed in claim 1, wherein the polarizer is a cholesteric polarizer.

10. An illumination system as claimed in claim 1, wherein the polarizer is a polarizing beam splitter.

11. An illumination system as claimed in claim 8, wherein the first reflecting means are specularly reflecting and in that a $\lambda/4$ plate is present on the first reflecting means or between the first and the second reflecting means.

12. An illumination system as claimed in claim 9, wherein the first reflecting means are specular means.

13. An illumination system as claimed in claim 9, wherein the cholesteric polarizer has a single layer of a liquid crystalline polymer material, within which layer the pitch of the molecular helix varies between two values which correspond to the lower limit and the upper limit, respectively, of the reflection band required to cover at least the full visible wavelength range.

14. An illumination system as claimed in claim 9, wherein a $\lambda/4$ plate is present between the cholesteric polarizer and the display panel.

15. An illumination system as claimed in claim 1, wherein which the integrator system comprises a first and a second lens plate, wherein the second lens plate is semicircular, the illumination system being adapted to supply a semicircular illumination beam at the location of the second lens plate.

16. An image projection device comprising, in this order, an illumination system, an image display system for modulating an illumination beam to be supplied by the illumination system, and a projection lens system, wherein the illumination system is implemented as claimed in claim 1.

17. An image projection device as claimed in claim 16, in which the integrator system comprises a first and a second lens plate, wherein the lenses of the first lens plate have an aspect ratio which corresponds to that of the display panel.

18. A presentation system comprising an image projection screen and an overhead projector which is provided with an illumination system, a support for supporting an image record carrier and a head for projecting the image present in the image record carrier on the image projection screen, wherein the illumination system is implemented as claimed in claim 1.

19. A presentation system as claimed in claim 18, wherein the image projection screen is provided with a polarizer whose transmission polarization direction corresponds to the direction of polarization of the illumination beam to be supplied by the illumination system.

20. An integrator system suitable for use in an illumination system as claimed in claim 1 comprising a first and a second lens plate each being provided with a matrix of lenses, wherein a plurality of reflecting elements are integrated on the second lens plate.

* * * * *